United States Patent

[11] 3,570,621

[72] Inventor Robert O. Hampton
 117 E. St, SE Apt 201, Washington, D.C. 20003
[21] Appl. No. 807,454
[22] Filed Mar. 14, 1969
[45] Patented Mar. 16, 1971

[54] SAFETY BELT BUCKLE WITH ELECTRICAL CONNECTOR
 2 Claims, 5 Drawing Figs.
[52] U.S. Cl................................................... 180/82,
 280/150, 339/147
[51] Int. Cl..................................................... B60k 27/08
[50] Field of Search............................................ 339/147;
 180/82.8; 280/150 (SB); 244/122; 297/385;
 340/52, 278; 24/(Inquired)

[56] References Cited
UNITED STATES PATENTS
2,880,789  4/1959  Leibinger..................... 180/82.8
3,438,455  4/1969  Redmond..................... 340/278X Primary Examiner—Ernest R. Purser ABSTRACT: An automobile safety belt having male and female coupling members for connecting the belt together and electrical connection means carried by the coupling members and adapted to be connected together when the coupling members are connected. The electrical connection means are electrically connected to the automobile starter motor so that the safety belt must be closed before the starter motor can be operated.

PATENTED MAR 16 1971   3,570,621

INVENTOR.
Robert O. Hampton

SAFETY BELT BUCKLE WITH ELECTRICAL CONNECTOR

This invention relates to a buckle which provides an electrical connection in a circuit as well as connecting the ends of a safety belt. The invention is particularly useful in insuring that safety belts are fastened before the starter circuit of motor vehicles normally recommended to be fitted with safety belts can be energized.

An object of the invention is to provide a buckle which brings together a male and female plug connector wired into the starting circuit of a motor vehicle containing safety belts, when said safety belts are fastened, and thereby insuring the belt ends are connected before said circuit can be energized.

Another object of the invention is to provide a buckle which facilitates disassembly of electrical connector from the buckle for maintenance and in no way impairing the strength or function of the coupling members of said buckle as a safety belt connector.

A further object of the invention is to provide an electrical buckle connector which contains keys and slotted guides on the coupling members to insure a firm electrical connection when the buckle is fastened.

Yet another object of the invention is to provide an electrical buckle connector wherein the electrical flow is totally insulated from the wearer of the belt when the buckle is fastened, thus protecting the wearer from short circuits and possible physical harm.

Still a further object of the invention is to provide an electrical buckle connector which may be used with warning systems on airplanes and the like to indicate that safety belts are not fastened.

The accomplishment of these objects are hereinafter described in detail with the preferred form of construction illustrated in the accompanying drawings, of which:

Figure 1:
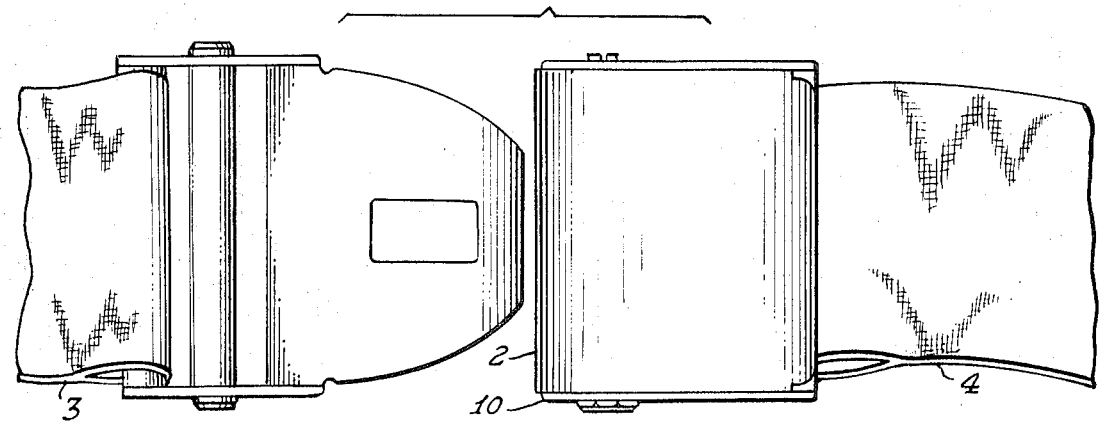
FIG. 1 is a perspective view of a typical safety belt buckle showing the uncoupled sliding member and receptacle.

Referring first to FIG. 1, a typical safety belt buckle showing separated coupling members 1 and 10, is illustrated. It is well known that the sliding member 1 is joined to the receptacle formed by cover 2 mounted atop 10 by manually inserting said member into the receptacle. The safety belt straps are, respectively 3 and 4.

Figure 2:
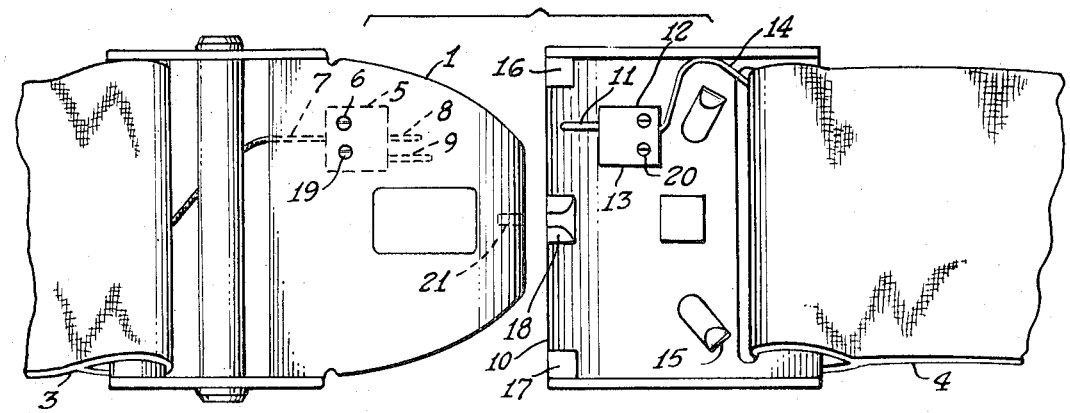
FIG. 2 is a perspective view of the buckle in FIG. 1 showing the receptacle without the topside and the embodiment of the present invention.

In FIG. 2 the buckle in FIG. 1 has cover 2 removed. On the underside of 1 is secured a male electrical connector 5 which will mate through contact 8 with the female electrical connector 13 which is secured to the topside of 10. Along with the key 21 (a part of 1) a guide 9 on the male electrical connector 5 and a guide 11 on the female connector 13 insure proper mating and a firm electrical contact.

The electrical connector 5 is secured to 1 through screws 6 and 19; and 7 is a wire conductor preferably soldered, but can be crimped, to the contact 8 on end and terminating in an electrical circuit normally used for vehicle starting or a warning indicator on the other. The connectors 5 and 13 must be connected before the starter motor of the vehicle can be energized.

The female connector 13 is secured to 10 through screws 12 and 20; and 14 also is a wire conductor preferably soldered to the internal contact of said connector and it too terminates in the aforesaid electrical circuit.

Figure 3:
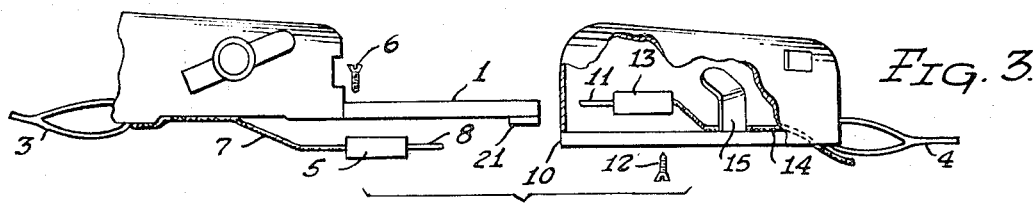
FIG. 3 is a side sectional view of FIG. 2 with the parts disassembled.

The male and female members, respectively 5 and 13, are shown disassembled from the buckle members 1 and 10 in FIG. 3 which is a side view of FIG. 2 with 10 partially cutaway. The countersunk screws 6 and 12 are shown in a position to secure the electrical connector to the buckle.

Figure 4:
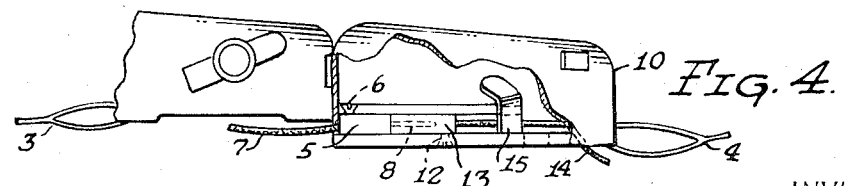
FIG. 4 is a side sectional view of FIG. 2 showing the electrical connectors mated.

When the safety belt buckle is fastened, 1 is manually inserted into the receptacle formed by 2 and 10; and connectors 5 and 13 mate as illustrated in FIG. 4 which is the same as FIG. 3 with the connectors assembled. Lip 15 insures a firm mechanical connection between the members 1 and 10 and provides sufficient clearance for the type of electrical connectors used.

Figure 5:
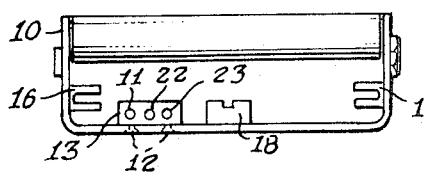
FIG. 5 is a partial view of the receptacle of the buckle showing further details of the present invention.

Slotted guides are provided on the receptacle part 10 to insure that the male and female members make firm electrical contact whenever the safety belt buckle is fastened. These guides are illustrated in FIG. 5. In order to insert sliding plate 1 into 10, the projection 21 (see FIGS. 2 and 3) must be aligned with the slot 18. After traveling a short distance the edges of 1 align with slots 16 and 17. Together, these guides insure that the male connector properly mates with the female connector. On releasing the sliding member 1 (by lifting 2 in FIG. 1) the inside flaring of slot 18 insures that plate 1 is not impeded.

The above description necessarily concentrates on a particular embodiment of the invention, however, the protection requested should not be restricted to this preferred construction, but instead the scope should extend to other embodiments in the spirit of the appended claims.

I claim:

1. In an automobile having a starter motor, at least one seat having a safety belt, a conventional safety belt buckle with male and female coupling members connecting said belt together, said female coupling member having a cavity for the reception of a generally flat rigid tongue on said male coupling member, means locking said coupling member in assembled relation and means on said female coupling member for selectively releasing said coupling members, the improvement comprising guide means disposed in the cavity in said female coupling member for slidably receiving and guiding opposite sides of the tongue of the male coupling member to guide said male member into predetermined locking position relative to said female member, a male electrical connector mounted on one of said coupling members and a female electrical connector mounted on the other of said coupling members, said electrical connectors being in alignment with each other, and said male and female electrical connectors being connected to the electrical circuit of the automobile starter motor so that the belt coupling members and said electrical connectors must be connected before the starter motor can be operated.

2. The structure of claim 1 including means on said electrical connectors for guiding the same into contacting engagement.